(12) United States Patent
Stamenkovic et al.

(10) Patent No.: US 11,596,928 B2
(45) Date of Patent: Mar. 7, 2023

(54) SCALABLE PT CLUSTER AND RUO2 HETEROJUNCTION ANODE CATALYSTS

(71) Applicant: UCHICAGO ARGONNE, LLC, Chicago, IL (US)

(72) Inventors: Vojislav Stamenkovic, Naperville, IL (US); Rongyue Wang, Naperville, IL (US); Dusan Strmcnik, Woodridge, IL (US)

(73) Assignee: UChicago Argonne, LLC, Chicago, IL (US)

( * ) Notice: Subject to any disclaimer, the term of this patent is extended or adjusted under 35 U.S.C. 154(b) by 330 days.

(21) Appl. No.: 16/584,385

(22) Filed: Sep. 26, 2019

(65) Prior Publication Data

US 2021/0094021 A1 Apr. 1, 2021

(51) Int. Cl.

| | |
|---|---|
| *B01J 23/56* | (2006.01) |
| *B01J 37/00* | (2006.01) |
| *B01J 37/04* | (2006.01) |
| *B01J 37/08* | (2006.01) |

(52) U.S. Cl.
CPC ............. *B01J 23/56* (2013.01); *B01J 37/009* (2013.01); *B01J 37/04* (2013.01); *B01J 37/08* (2013.01); *B01J 2523/821* (2013.01); *B01J 2523/828* (2013.01)

(58) Field of Classification Search
CPC ...... B01J 23/462; B01J 23/56; B01J 37/0013; B01J 37/04; B01J 37/08; B01J 37/34
See application file for complete search history.

(56) References Cited

U.S. PATENT DOCUMENTS

| | | |
|---|---|---|
| 2,602,070 A | 7/1952 | Kirkpatrick |
| 4,000,048 A | 12/1976 | Bianchi et al. |
| 4,331,523 A | 5/1982 | Kawasaki |
| 4,465,570 A | 8/1984 | Oda et al. |
| 5,681,445 A | 10/1997 | Harrison et al. |
| 6,517,802 B1 | 2/2003 | Xiao et al. |
| 9,255,334 B2 | 2/2016 | Subbaraman et al. |
| 2002/0150694 A1 | 10/2002 | Ye et al. |
| 2010/0084282 A1 | 4/2010 | Ganley et al. |
| 2013/0089739 A1 | 4/2013 | Polshettiwar et al. |
| 2013/0133483 A1* | 5/2013 | Yang .......................... B22F 9/26 75/363 |

(Continued)

FOREIGN PATENT DOCUMENTS

| | | | |
|---|---|---|---|
| CN | 102212840 A | 10/2011 | |
| CN | 108736029 A | * 11/2018 | .............. H01M 4/90 |
| WO | WO-2012/043085 A1 | 4/2012 | |

OTHER PUBLICATIONS

Lu et al. (One-pot synthesis of RtRu nanodendrites as efficient catalysts formethanol oxidation reaction, Nanoscale, 2017, 9 1033-1039).*

(Continued)

*Primary Examiner* — Jun Li
(74) *Attorney, Agent, or Firm* — Foley & Lardner LLP

(57) ABSTRACT

A synthesis process for forming nanodendrites. The nanodendrites are utilized in a process to form a heterojunction catalyst. Nanodendrites may include $PtRu_8$ nanodendrites that can be oxidized through annealing to form $PtRuO_2$. One heterojunction catalyst comprises $PtRuO_2$ on a carbon support.

15 Claims, 7 Drawing Sheets

(56) References Cited

U.S. PATENT DOCUMENTS

2013/0168237 A1    7/2013    Sugimasa

OTHER PUBLICATIONS

Guo et al. (Highly branched ultrathin Pt—Ru nnaodendrites, Chem. Commun. 2019, 55, 11131-11134).*
Zheng et al. (Facile synthesis of platinum-ruthenium nanodendrites supported on reduce graphen oxide with enhanced electrocatalytic properties, Journal of Power Sources, 266 (2014), 259-267).*
Wang et al., Ultrafine Pt cluster and RuO2 heterojunction anode catalysts designed for ultra-low Pt-loading anion exchange membrane fuel cells, Nanoscale Horiz., 2020, 5, 316-324, publication date Oct 4, 2019.*
Sanles-Sobrido et al., Highly Catalytic Single-Crystal Dendritic Pt Nanostructures Supported on Carbon Nanotubes, Chem. Mater. 2009, 21, 8, 1531-1535; Publication Date:Mar. 26, 2009.*
Alesker, et al., "Palladium/nickel bifunctional electrocatalyst for hydrogen oxidation reaction in alkaline membrane fuel cell," Journal of Power Sources 304, pp. 332-339 (2016).
Alia & Pivovar, "Evaluating Hydrogen Evolution and Oxidation in Alkaline Media to Establish Baselines," Journal of The Electrochemical Society 165(7), pp. F441-F455 (2018).
Angerstein-Kozlowska, et al., "Electrocatalytic Mediation of Oxidation fo H2 at Gold by Chemisobed States of Anions," Journal of Electroanalytical Chemistry and Interfacial Electrochemistry 277(1-2), pp. 233-252 (1990).
Arenz, et al., "The effect of the particle size on the kinetics of CO electrooxidation on high surface area Pt catalysts," Journal of the American Chemical Society 127(18), pp. 6819-6829 (2005).
Auinger, et al., "Near-Surface Ion Distribution and Buffer Effects During Electrochemical Reactions," Physical Chemistry Chemical Physics 13(36), pp. 16384-16394 (2011).
Balasubramanian, et al., "X-Ray Absorption Spectroscopy Study of the Local Structure of Heavy Metal Ions Incorporated into Electrodeposited Nickel Oxide Films," Journal of the Electrochemical Society 146(2), pp. 607-614 (1999).
Barber & Conway, "Structural Specificity of the Kinetics of the Hydrogen Evolution Reaction on the Low-index Surfaces of Pt Single-Crystal Electrodes in 0.5 M dm-3 NaOH1," Journal of Electroanalytical Chemistry 461(1-2), pp. 80-89 (1999).
Biancolli, et al., "ETFE-based anion-exchange membrane ionomer powders for alkaline membrane fuel cells: a first performance comparison of head-group chemistry," Journal of Materials Chemistry A 6(47), pp. 24330-24341 (2018).
Campbell, "Bimetallic surface chemistry," Annual Review of Physical Chemistry 41, pp. 775-837 (1990).
Chung, et al., "Cation-Hydroxide-Water Coadsorption Inhibits the Alkaline Hydrogen Oxidation Reaction," The Journal of Physical Chemistry Letters 7(22), pp. 4464-4469 (2016).
Climent, et al., "Potential of Zero Charge of Platinum Stepped Surfaces: A Combined Approach of CO Charge Dispalcement and N2O Reduction," Journal of Electroanalytical Chemistry 532(1-2), pp. 67-74 (2002).
Conway & Bockris, "Electrolytic Hydrogen Evolution Kinetics and Its Relation to the Electronic and Adsorptive Properties of the Metal," The Journal of Chemical Physics 26(3), pp. 532-541 (1957).
Conway & Tilak, "Interfacial processes involving electrocatalytic evolution and oxidation of H2, and the role of chemisorbed H," Electrochemica Acta 47(22-23), pp. 3571-3594 (2002).
Danilovic, et al., "Enhancing the Alkaline Hydrogen evolution Reaction Activiity through the Bifunctionality of Ni(OH)2/Metal Catalysts," Angewandte Chemie 51(50), pp. 12495-12498 (2012).
Fu, et al., "Active nonmetallic Au and Pt species on ceria-based water-gas shift catalysts," Science 301(5635), pp. 935-938 (2003).
Gasteiger, et al.,. "Activity benchmarks and requirements for Pt, Pt-alloy, and non-Pt oxygen reduction catalysts for PEMFCs," Applied Catalysis B: Environmental 56(1-2), pp. 9-35 (2005).
Gasteiger, et al., "LEIS and AES on Sputtered and Annealed Polycrystalline Pt—Ru Bulk Alloys," Surface Science 293(1-2), pp. 67-80 (1993).
Gerisher, "Mechanismus Der Electrolytischen Wasser-Stoffabscheidung Und Adsorptionsenergie Von Atomarem Wasserstoff," Bulletin des Sociétés Chimiques Beiges 67(7-8), pp. 506-527 (1958).
Gottsfeld, et al., "Anion exchange membrane fuel cells: Current status and remaining challenges," Journal of Power Sources 375, pp. 170-184 (2018).
Greeley & Markovic, "The road from animal electricity to green energy: combining experiment and theory in electrocatalysis," Energy & Environmental Science 5(11), pp. 9246-9256 (2012).
Greeley, et al., "Computational hihg-throughput screening of electrocatalytic materials for hydrogen evolution," Nature Materials 5, pp. 909-913 (2006).
Greeley, et al., "Hydrogen evolution over bimetallic systems: understanding the trends," ChemPhysChem 7(5), pp. 1032-1035 (2006).
Gu, et al., "An efficient Ag-ionomer interrace tor hydroxide exchange memorane fuel cells," Chemical Communications 49(2), pp. 131-133 (2013).
Hall, "Plasma-sprayed nickel cathode coatings for hydrogen evolution in alkaline electrolytes," Journal of Applied Electrochemistry 14(1), pp. 107-115 (1984).
Han, et al., "Hydrogen evolution reaction on amorphous Ni—S—Co alloy in alkaline medium," International Journal of Hydrogen Energy 28(12), pp. 1345-1352 (2003).
Henderson, "The interaction of water with solid surfaces: fundamental aspects revisited," Surface Science Reports 46(1-8), pp. 1-308 (2002).
Hu, et al., "Alkaline polymer electrolyte fuel cell with Ni-based anode and Co-based cathode," International Journal of Hydrogen Energy 38(36), pp. 16264-16268 (2013).
Jaramillo, et al., "Identification of active edge sites for electrochemical H2 evolution from MoS2 Nanocatalysts," Science 317(5834), pp. 100-102 (2007).
Kabir, et al., "Platinum group metal-free NiMo hydrogen oxidation catalysts: high performance and durability in alkaline exchange membrane fuel cells," Journal of Materials Chemistry A 5(46), pp. 24433-24443 (2017).
Kim & Pivovar, "The Membrane-Electrode Interface in PEFCs: IV. The origin and implications of interfacial resistance," Journal of The Electrochemical Society 157(11), pp. B1616-B1623 (2010).
Kim, "Advanced Materials for Fully-Integrated MEAs in AEMFCs," Annual Merit Review and Peer Evaluation Meeting for the Hydrogen and Fuel Cells Program, FC146, 29 pages (2017).
Knudsen, et al., "Low-Temperature CO Oxidation on Ni(111) and on a Au/Ni(111) Surface Alloy," ACS Nano 4(8), pp. 4380-4387 (2010).
Kocha, et al., "Best Practices and Testing Protocols for Benchmarking ORR Activities of Fuel Cell Electrocatalysts Using Rotating Disk Electrode," Electrocatalysis 8(4), pp. 366-374 (2017).
Los, et al., "Hydrogen evolution reaction on Ni—Al electrodes," Journal of Applied Electrochemistry 23(2), pp. 135-140 (1993).
Lu, et al., "Alkaline polymer electrolyte fuel cells completely free from noble metal catalysts," Proceedings of the National Academy of Sciences 105(52), pp. 20611-20614 (2008).
Marinkovic, et al., "Hydrogen Adsorption on Single-Crystal Platinum Electrodes in Alkaline Solutions," Journal of Electroanalytical Chemistry 330(1-2), pp. 433-452 (1992).
Markovic & Ross, "Surface science studies of model fuel cell electrocaralysts," Surface Science Reports 45(4-6), pp. 117-229 (2002).
Markovic, et al., "Electrooxidation of CO and H2/Co Mixtures on Pt(111) in Acid Solutions," Journal of Physical Chemistry B 103(3), pp. 487-495 (1999).
Markovic, et al., "Hydrogen electrochemistry on platinum low-index single-crystal surfaces in alkaline solution," Journal of the Chemical Society, Faraday Transactions 92(20), pp. 3719-3725 (1996).
Markovic, et al.,"Temperature-depenaent hydrogen electrochemistry on platinum low-index single-crystal surfaces in acid solutions," Journal of Physical Chemistry B 101(27), pp. 5405-5413 (1997).

(56) References Cited

OTHER PUBLICATIONS

Matanovic, et al., "Benzene Adsorption: A Significant Inhibitor for the Hydrogen Oxidation Reaction in Alkaline Conditions," The Journal of Physical Chemistry Letters 8(19), pp. 4918-4924 (2017).
Maurya, et al., "Surface Adsorption Affects the Performance of Alkaline Anion-Exchange Membrane Fuel Cells," ACS Catalysis 8(10), pp. 9429-9439 (2018).
Maurya, et al., "Toward Improved Alkaline Membrane Fuel Cell Performance Using Quaternized Aryl-Ether Free Polyaromatics," Chemistry of Materials 30(7), pp. 2188-2192 (2018).
Merte, et al., "Correlating STM contrast and atomic-seal strucutre by chemical modification: Vacancy dislocation loops on FeO/Pt(111)," Surcface Science 603(2), pp. L15-L18 (2009).
Miller, et al., "A Pd/C—CeO2 Anode Catalyst for High-Performance Platinum-Free Anion Exchange Membrane Fuel Cells," Angewandte Chemie 128(20), pp. 6108-6111 (2016).
Miousse & Lasia, "Hydrogen evolution reaction on RuO2 electrodes in alkaline solutions," Journal of New Materials for Electrochemical Systems 2, pp. 71-78 (1999).
Montilla, et al., "Electrochemical behaviour of benzene on platinum electrodes," Electrochimica Acta 45(25-26), pp. 4271-4277 (2000).
Norskov, et al., "Towards the Computational Design of Solid Catalysts," Nature Chemistry 1, pp. 37-46 (2009).
Ohyama, et al., "High performance of Ru nanoparticles supported on carbon for anode electrocatalyst of alkaline anion exchange membrane fuel cell," Journal of Power Sources 225, pp. 311-315 (2013).
Omasta, et al., "Beyond 1.0 W cm-2 Performance without Platinum: The Beginning of a New Era in Anion Exchange Membrane Fuel Cells," Journal of The Electrochemical Society 165(15), pp. J3039-J3044 (2018).
Omasta, et al., "Beyond catalysis and membranes: visualizing and solving the challenge of electrode water accumulation and flooding in AEMFCs," Energy & Environmental Science 11(3), pp. 551-558 (2018).
Omasta, et al., "Importance of balancing membrane and electrode water in anion exchange membrane fuel cells," Journal of Power Sciences 375, pp. 205-213 (2018).
Omasta, et al., "Strategies for Reducing the PGM Loading in High Power AEMFC Anodes," Journal of The Electrochemical Society 165(9), pp. F710-F717 (2018).
Parsons, "The rate of electrolytic hydrogen evolution and the heat of adsorption of hydrogen," Transactions of the Faraday Society 54, pp. 1053-1063 (1958).
Petrii & Tsirlina, "Electrocatalytic Activity Prediction for Hydrogen Electrode reaction: Intuition, Art, Science," Electrochemica Acta 39(11-12), pp. 1739-1747 (1994).
Robinson, Crystal truncation rods ana surface roughness, Physical review B 33(6), pp. 3830-3836 (1986).
Rodriguez, et al., "Activity of CeOx and TiOx Nanoparticles Grown on Au(111) in the Water-Gas Shift Reaction," Science 318(5857), pp. 1757-1760 (2007).
Roy, et al., "Nickel-copper supported on a carbon black hydrogen oxidation catalyst integrated into an anion-exchange membrane fuel cell," Sustainable Energy & Fuels 2(10), pp. 2268-2275 (2018).
Russell & Rose, "X-ray absorption spectroscopy of low temperature fuel cell catalysts," Chemical Reviews 104(10), pp. 4613-4636 (2004).
Schmidt, et al., "Temperature dependent surface electrochemistry on Pt single crystals in alkaline electrolytes: Part 2. The hydrogen evolution/oxidation reaction," Journal of Electroanalytical Chemistry 524-525, pp. 252-260 (2002).
Sheng, et al., "Hydrogen Oxidation and Evolution Reaction Kinetics on Platinum: Acid vs Alkaline Electrolytes," Journal of The Electrochemical Society 157 (11), pp. B1529-B1536 (2010).
Skulason, et al., "Modeling the Electrochemical Hydrogen Oxidationadn Evolution Reactions on the Basis of Density Functionakl Theory Calculations," The Journal of Physical Chemistry C 114(42), pp. 18182-18197 (2010).

Staszak-Jirkovsky, et al., "Design of active and stable Co—Mo—Sx chalcogels as pH-universal catalysts for the hydrogen evolution reaction," Nature Materials 15, pp. 197-203 (2016).
Stoffelsma, et al., "Promotion of the Oxidation of Carbon Monoxide at Stepped Platinum SingleCrystal Electrodes in Alkaline Media by Lithium and Beryllium Cations," Journal of the American Chemical Society 132(45), pp. 16127-16133 (2010).
Strmcnik, et al., "Enhanced electrocatalysis of the oxygen reduction reaction based on patterning of platinum surfaces with cyanide," Nature Chemistry 2, pp. 880-885 (2010).
Strmcnik, et al., "Improving the hydrogen oxidation reaction rate by promotion of hydroxyl adsorption," Nature Chemistry 5, pp. 300-306 (2013).
Strmcnik, et al., "The role of non-covalent interactions in electrocatalytic fuel-cell reactions on platinum," Nature Chemistry 1, pp. 466-472 (2009).
Strmcnik, et al., "Unique activity of platinum adislands in the CO electrooxidation reaction," Journal of the American Chemical Society 130(46), pp. 15332-15339 (2008).
Subbaraman, et al., "Enhancing Hydrogen Evolution Activity in Water Splitting by Tailoring Li -Ni(OH)2-Pt Interfaces," Science 3334(6060), pp. 1256-1260 (2011).
Subbaraman, et al., "Enhancing Hydrogen Evolution Activity in Water Splitting by Tailoring Li -Ni(OH)2-Pt Interfaces," Science 334(6060), pp. 1256-1260 (2011).
Subbaraman, et al., "Origin of anomalous Activities for Electrocatalysts in Alkaline Electrolytes," The Journal of Physical Chemistry 116(42), p. 22231-22237 (2012).
Subbaraman, et al., "Three phase interfaces at electrified metal-solid electrolyte systems 1. Study of the pt(hkl)-nafion interface," Journal of Physical Chemistry C 114(18), pp. 8414-8422 (2010).
Subbaraian, et al.,"Trends in activity for the water eiectrolyser reactions on 3d M(Ni,Co,Fe,Mn) hydr(oxy)oxide catalysts," Nature Materials 11, pp. 550-557 (2012).
Thiel & Madey, "The interaction of water with solid surfaces: Fundamental aspects," Surface Sciencce Reports 7(6-8), pp. 211-385 (1987).
Tidswell, et al., "Potential dependent structure of single crystal gold interfaces in alkaline electrolyte: an in situ X-ray scattering study," Surface Science 317(1-2), pp. 241-252 (1994).
Trasatti, "Work function, electronegativity, and electrochemical behaviour of metals: III. Electrolytic hydrogen evolution in acid solutions," Journal of Electroanalytical Chemistry and Interfacial Electrochemistry 39(1), pp. 163-184 (1972).
Wang, et al., "An optimised synthesis of high performance radiation-grafted anion-exchange membranes," Green Chemistry 19(3), pp. 831-843 (2017).
Wang, et al., "Non-fluorinated pre-irradiation-grafted (peroxidated) LDPE-based anion-exchange membranes with high performance and stability," Energy & Environmental Science 10(10), pp. 2154-2167 (2017).
Wang, et al., "Pt—Ru catalyzed hydrogen oxidation in alkaline media: oxophilic effect or electronic effect," Energy & Environmental Science 8(1), pp. 177-181 (2015).
Wang, et al., "Synergistic Mn—Co catalyst outperforms Pt on high-rate oxygen reduction for alkaline polymer electrolyte fuel cells," Nature Communications 10, 1506, 8 pages (2019).
Wang, et al., "The first anion-exchange membrane fuel cell to exceed 1 W cm-2 at 70C with a non-Pt-group (O2) cathode," Chemical Communications 53(86), pp. 11771-11773 (2017).
Yim, et al., "A Microelectrode Study of Interfacial Reactions at the Platinum-Alkaline Polymer Interface," Journal of The Electrochemical Society 162(6), pp. F499-F506 (2015).
Yin, et al., "Ultrathin platinum nanowires grown on single-layered nickel hydroxide with high hydrogen evolution activity," Nature Communications 6, 6430, 8 pages (2015).
Bhowmik, et al., "Palladium Nanoparticle-Graphitic Carbon Nitride Porous Synergistic Catalyst for Hydrogen Evolution/Oxidation Reactions over a Broad Range of pH and Correlation of Its Catalytic Activity with Measured Hydrogen Binding Energy," ACS Catalysis 6(3), pp. 1929-1941 (2016).

(56) References Cited

OTHER PUBLICATIONS

Cong, et al., "Uniform Pd0.33Ir0.67 nanoparticles supported on nitrogen-doped carbon with remarkable activity toward the alkaline hydrogen oxidation reaction," Journal of Materials Chemistry A 7(7), pp. 3161-3169 (2019).

Langlois, et al., "A rejuvenation process to enhance the durability of low Pt loaded polymer electrolyte membrane fuel cells," Journal of Power Sources 396, pp. 345-354 (2018).

Li, et al., "Impact of ionomer adsorption on alkaline hydrogen oxidation activity and fuel cell performance," Current Opinion in Electrochemistry 12, pp. 189-195 (2018).

Li, et al., "The Comparability of Pt to Pt—Ru in Catalyzing the Hydrogen Oxidation Reaction for Alkaline Polymer Electrolyte Fuel Cells Operated at 80C," Angewandte Chemie 131(5), pp. 1456-1460 (2019).

Maurya, et al., "Rational design of polyaromatic ionomers for alkaline membrane fuel cells with >1 W cm-2 power density," Energy & Environmental Science 11(11), pp. 3283-3291 (2018).

Mustain, "Understanding how high-performance anion exchange membrane fuel cells were achieved: Component, interfacial, and cell-level factors," Current Opinion in Electrochemistry 12, pp. 233-239 (2018).

Qin, et al., "A novel IrNi@PdIr/C core-shell electrocatalyst with enhanced activity and durability for the hydrogen oxidation reaction in alkaline anion exchange membrane fuel cells," Nanoscale 10(10), pp. 4872-4881 (2018).

Qin, et al., "Ultrathin IrRu nanowire networks with high performance and durability for the hydrogen oxidation reaction in alkaline anion exchange membrane fuel cells," Journal of Materials Chemistry A 6(10), pp. 20374-20382 (2018).

Serov, et al., "Hot topics in alkaline exchange membrane fuel cells," Journal of Power Sources 375, pp. 149-157 (2018).

Wang, et al., "Phase and Interface Engineering of Platinum-Nickel Nanowires for Efficient Electrochemical Hydrogen Evolution," Angewandte Chemie 55(41), pp. 12859-12863 (2016).

\* cited by examiner

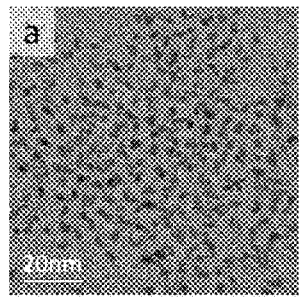 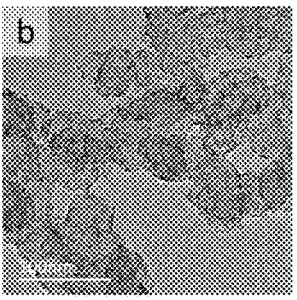 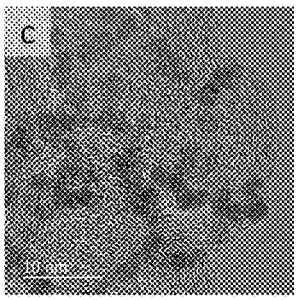 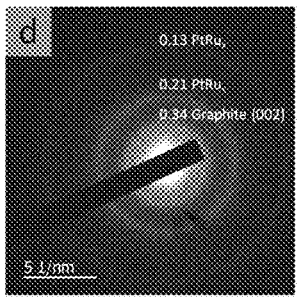
FIG. 1A　　　FIG. 1B　　　FIG. 1C　　　FIG. 1D
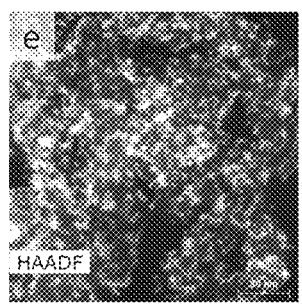 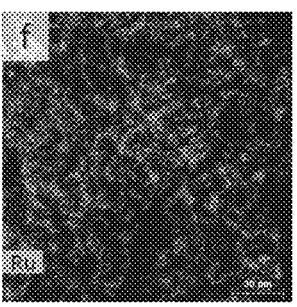 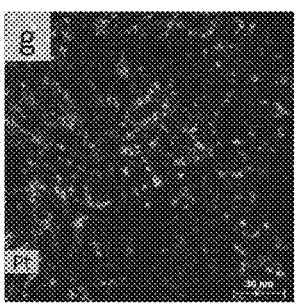 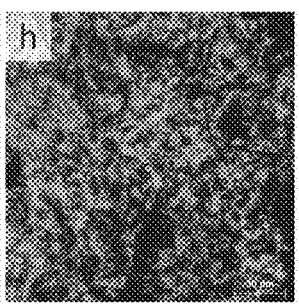
FIG. 1E　　　FIG. 1F　　　FIG. 1G　　　FIG. 1H
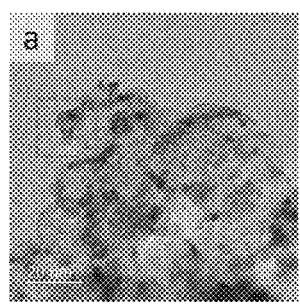 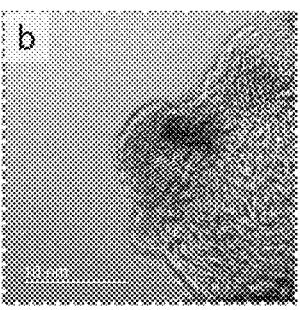 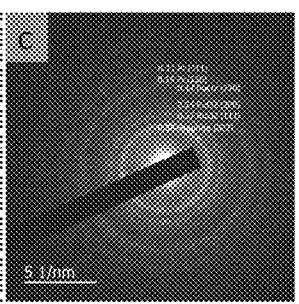 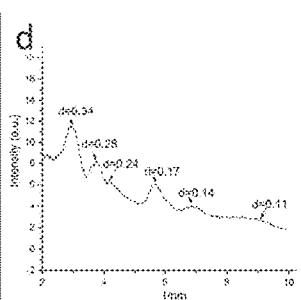
FIG. 2A　　　FIG. 2B　　　FIG. 2C　　　FIG. 2D
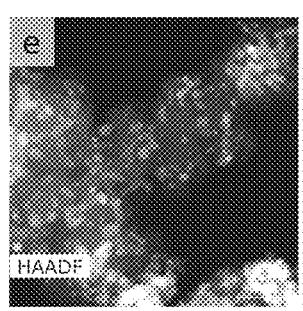 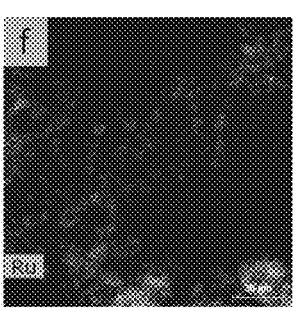 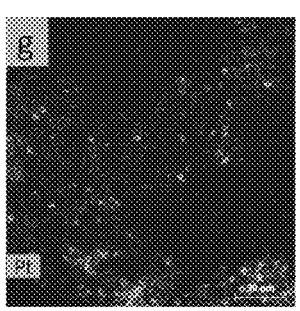 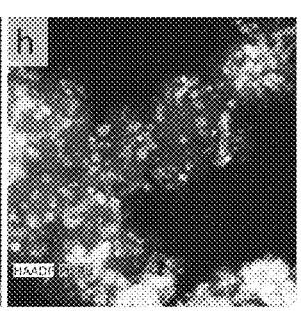
FIG. 2E　　　FIG. 2F　　　FIG. 2G　　　FIG. 2H

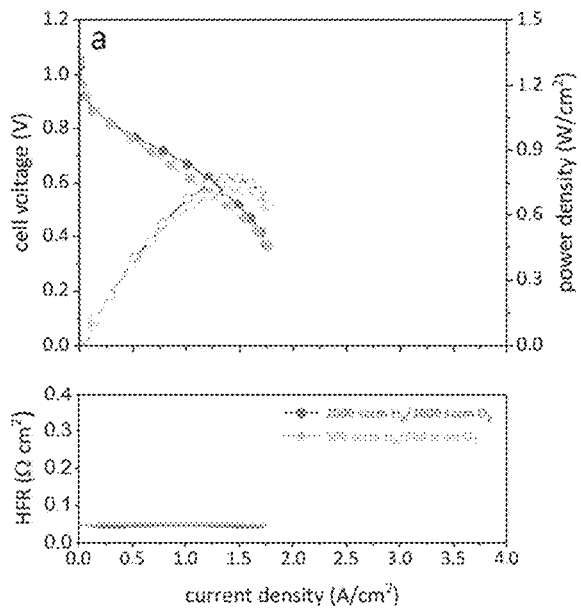
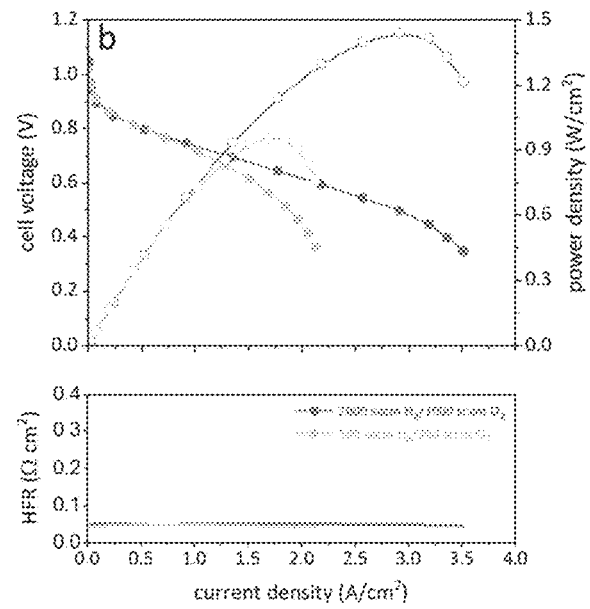
FIG. 8A  FIG. 8B
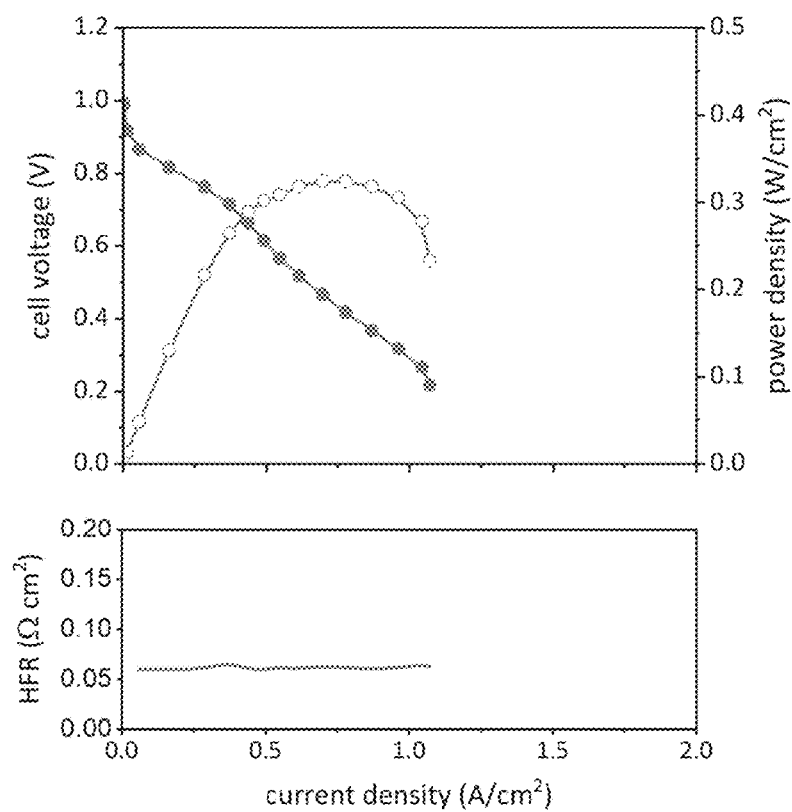
FIG. 9

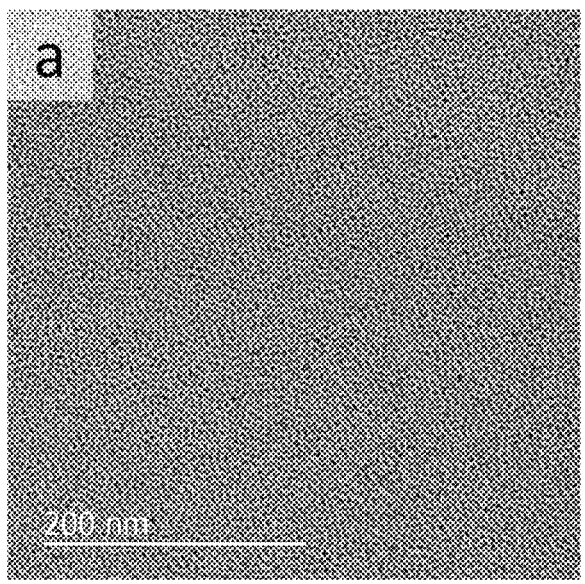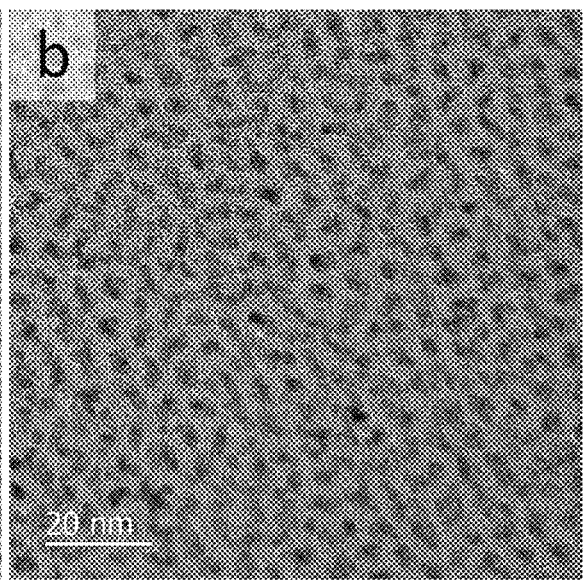
FIG. 11A                FIG. 11B
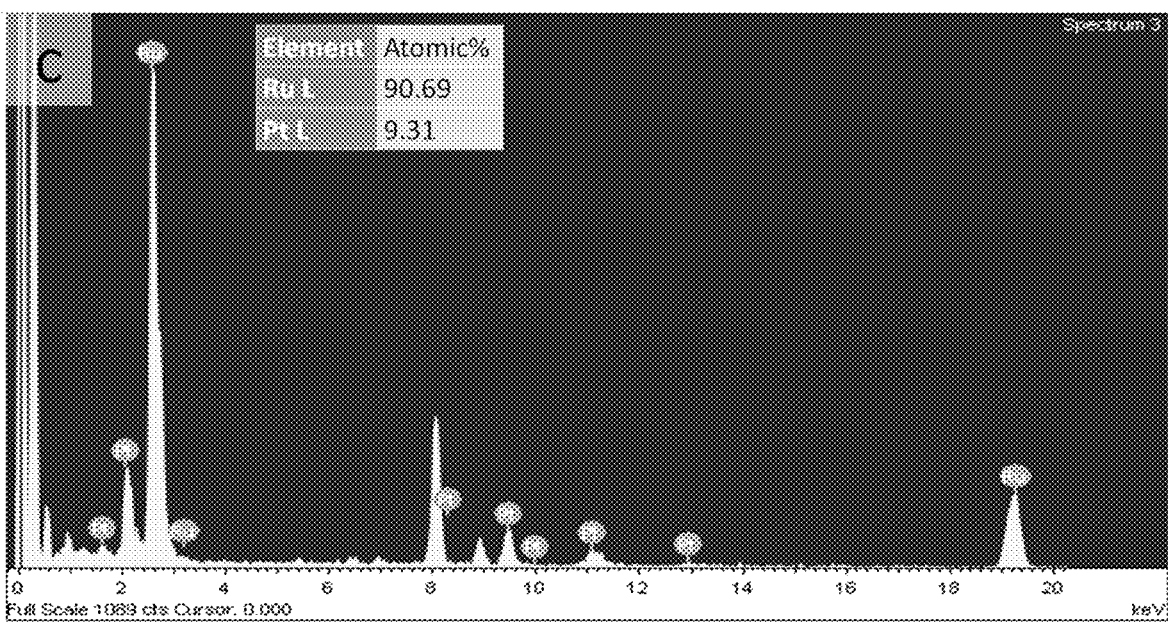
FIG. 11C

SCALABLE PT CLUSTER AND RUO2 HETEROJUNCTION ANODE CATALYSTS

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates to catalytic materials, specifically to heterojunction materials from nanodendrites.

BACKGROUND

The recent development of novel membranes and ionomers with enhanced hydroxide conductivity and alkaline stability opens up new opportunities for the alkaline anion-exchange membrane fuel cells ("AEMFCs"). However, most of the membrane electrode assemblies ("MEAs") demonstrating high peak power density in literature used a substantial amount of Pt-group metal ("PGM") catalysts for the anode and cathode. Developing cost-effective oxygen reduction reaction ("ORR") catalysts for AEMFCs has been partly successful as the MEAs employing less expensive ORR catalysts showed ~1 W/cm$^2$ peak power density. However, developing low-cost electrocatalysts for the hydrogen oxidation reaction ("HOR") of the AEMFCs has limited success; therefore, the cost-benefits of AEMFCs over the proton-exchange membrane fuel cells ("PEMFCs") have diminished. Replacing Pt-based HOR catalysts with highly active Pd-based catalysts has become less attractive as the price of Pd is getting higher than that of Pt. Replacing Pt catalysts with non-PGM catalysts has had only limited success because of the relatively low catalytic activity and anode flooding. Reducing Pt loading in the AEMFC anode is a potential solution to reduce the overall cost of AEMFCs. Recently, Omasta, et al., reported ~0.8 W/cm$^2$ peak power density with a low Pt-loading anode-catalyzed MEA (Anode Pt loading=0.073 mg$_{Pt}$ cm$^{-2}$).

To develop highly efficient HOR catalysts for the advanced AEMFC system, not only does the intrinsic kinetic activity of the electrocatalyst need to be taken into account, so too do other parameters, such as compatibility of the catalyst with ionomer of MEA, water management, and the scalability of the catalyst synthetic procedure. Our previous work of HOR on bulk alloy electrode surfaces demonstrated that Pt—Ru bimetallic alloy catalysts have benefits because Ru would provide the sites for OH$_{ad}$, which can then effectively remove the hydrogen intermediates that are present on the nearby Pt sites. Further, work at Los Alamos National Laboratory found that Pt—Ru bimetallic alloy catalysts also have benefits to minimize the phenyl group adsorption which significantly increases the HOR current density up to 0.5 V vs. reversible hydrogen electrode ("RHE"). Since most ionomeric binders used for the electrolytes of AEMFCs contain phenyl group, the unique low phenyl group adsorbing characteristics of Pt—Ru bimetallic alloy catalysts have shown the dramatic increase in AEMFC power density to ~1.5 W/cm$^2$ for MEAs using polyaromatic ionomers. Other researchers demonstrated the AEMFC power density of >2.0 W/cm$^2$ with the MEAs using less phenyl-containing polyolefinic ionomers. Incorporating Ru element to Pt catalyst may significantly reduce the HOR catalyst cost as the Ru price is only ~30% of Pt; however, it is still challenging to maintain the excellent anode performance at low Pt-loading anode with Pt—Ru bimetallic alloys because the water generated from HOR in the thin catalyst layer promotes anode flooding.

SUMMARY

At least one embodiment relates to a method of forming a PtRuO$_2$ heterojunction catalyst. The method includes forming a solution of platinum precursor, a ruthenium precursor, diphenyl ether, 1,2-tetradecanediol, oleylamine, and dichlorobenzene. The solution is heated to a reaction temperature between 230-270° C. for 5 min-1 h, forming nanodendrites. The nanodendrites are separated from the solution and suspended in organic solvent forming a suspension. The carbon is mixed with the suspension. The carbon material is isolated from the suspension and annealed, converting Ru to RuO$_2$.

Another embodiment relates to a method of forming a nanodendrites. The method comprises forming a solution of platinum precursor, a ruthenium precursor, diphenyl ether, 1,2-tetradecanediol, oleylamine, and dichlorobenzene. The solution is heated to a reaction temperature between 230-270° C. for 5 min-1 h. PtRu$_8$ are separated nanodendrites from the solution.

Yet another embodiment relates to a heterojunction catalyst. The catalyst comprises a carbon substrate and a catalytic material support on the substrate, the catalytic material comprising PtRuO$_2$. The Pt particles have a diameter of 1-5 nm and RuO$_2$ particles have a diameter of 2-20 nm, the Pt particles and the RuO$_2$ particles being atomically connected.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIGS. 1A-1H show transmission electron microscopy ("TEM") characterization of PtRu$_8$ nanodendrites: TEM image of as synthesized nanodendrites (FIG. 1A), TEM image (FIG. 1B), high-resolution transmission electron microscopy ("HRTEM") image (FIG. 1C), select area electron diffraction (FIG. 1D), high-angle annular dark-field ("HAADF") image (FIG. 1E), and energy-dispersive X-ray spectroscopy ("EDS") mapping of carbon-supported PtRu$_8$ nanodendrites (FIGS. 1F-1H).

FIGS. 2A-2I show TEM characterization of Pt—RuO$_2$ heterojunctions: TEM image (FIG. 2A), HRTEM image (FIG. 2B), select area electron diffraction (FIGS. 2C-2D), HAADF image (FIG. 2E), and EDS mapping of Pt—RuO$_2$ heterojunctions (FIGS. 2F-2I).

FIGS. 8A-8B are graphs showing the effect of flow rate on AEMFC performance.

FIG. 8A shows Pt—$RuO_2$/C anode catalyzed MEA, and FIG. 8B shows JM HiSPEC® 12100 Pt—Ru/C anode (0.5 $mg_{Pt}/cm^2$) catalyzed MEA at 80° C. and 285 kPa backpressure under fully humidified gas feed.

FIG. 9 is a graph of the AEMFC performance in $H_2/CO_2$-free air with Pt—$RuO_2$/C as an anode and Pt/C as a cathode. Fuel cells performances were obtained with fully humidified 2000 sccm $H_2$ and 1000 sccm $CO_2$-free air at 285 kPa backpressure.

FIGS. 11A-11C show TEM images and EDX spectroscopy of PtRu nanoparticles synthesized in diphenyl ether with one-pot synthesis.

DETAILED DESCRIPTION

Figure 3A:
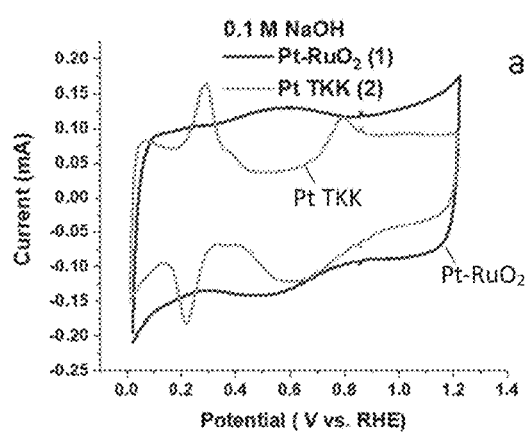
FIGS. 3A-3B show cyclic voltammograms (FIG. 3A) and HOR curves (FIG. 3B) of Pt—RuO$_2$ and Pt TKK in 0.1 M sodium hydroxide ("NaOH").

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Certain embodiments relate to a Pt—$RuO_2$ heterojunction catalysts. Such catalysts may be used for cost-effective HOR. Rather than strictly alloying elemental Pt and elemental Ru, one embodiment synthesizes Pt—$RuO_2$ heterojunction catalysts from $PtRu_8$ nanodendrites.

One embodiment relates to a method of forming heterojunction catalysts. Specifically, heterojunctions may comprise Pt—$RuO_2$ catalysts or are other stoichiometric ratios. Further, other elements, such as Ni and Co, may be used rather than Ru.

The heterojunction catalysts are prepared from nanodendrites; one embodiment uses $PtRu_8$ nanodendrites. In one embodiment, the $PtRu_8$ nanodendrites are formed through a solvothermal synthesis process using an organic solvent, such as diphenyl ether, and an organic reducing agent, such as an organic diol (e.g., 1,2-tetradecanediol), and a surfactant, such as oleylamine, which helps the particle uniformity and size control.

The metals that form the nanodendrites are supplied via respective precursors, for example platinum precursors and ruthenium precursors In one embodiment, the Pt precursor is platinum (II) acetylacetonate [Pt(acac)$_2$]. In one embodiment, the Ru precursor is ruthenium(III) acetylacetonate [Ru(acac)$_3$]. The ratio of Pt precursor to Ru precursor should be selected to approximate the desired ration in the catalytic material, such as for $PtRu_8$, a ratio of Pt:Ru precursors of 1:12 to 1:6.

In one embodiment, the nanodendrites are formed through addition of 5-15 mg/ml (e.g., 10 mg/ml) Ru(acac)$_3$, 0.5-1.5 mg/ml (e.g., 1 mg/ml) Pt(acac)$_2$ in diphenyl ether with 0.2-10 mg/ml (e.g., 5 mg/ml) of 1,2-tetradecanediol and 0.01-0.5 ml/ml (e.g., 0.2 ml/ml) oleylamine. These relative amounts may be scaled in some embodiments for a larger reaction batch. The nanodendrite reaction proceeds at a dendrite reaction temperature, such as 230-270° C. (e.g., 260° C.), and a dendrite reaction time, such as 5 min to 1 h. In one embodiment, dichlorobenzene is not injected until the temperature of the solution of 1,2-tetradecanediol and diphenyl reaches 200° C. as it is being heated. In another embodiment, a one pot synthesis approach is utilized with all of the ingredients added and the solution heated to the dendrite reaction temperature.

$PtRu_8$ nanodendrites are separated from the solvents. In one embodiment, the separation is by centrifuge (10000 rpm for 10 min). The collected nanodendrites are then dispersed in an organic solvent, such as chloroform.

The collected nanodendrites are then used to form the heterojunction catalyst. The nanodendrites suspended in an organic solvent are mixed with carbon. In one embodiment, the carbon is in the form of carbon nanoparticles, such as 20-100 nm in diameter. In one embodiment, the ratio of carbon to catalytic material (such as $PtRuO_2$) nanodendrites is 50:1 to 3:1. The mixture is agitated, such as by sonication, for a mixing time and then precipitated, such as by addition of hexane.

The nanodendrite/carbon mixture is annealed to convert the elemental Ru to $RuO_2$. The annealing step also removes remaining solvent or surfactant. In on embodiment, the annealing is at an annealing temperature within the range of 100–200° C. (e.g., 185° C.) in an ambient air environment. In one embodiment, the annealing is for an annealing time, such as overnight (8-12 hours).

In one embodiment, the heterojunction catalyst comprises ultrafine Pt particles atomically connected with $RuO_2$. Ultrafine particles are those below 5 nm, such as 1-5 nm, preferably 2-3 nm. $RuO_2$ size is not well defined and can be 3-5 nm to 20 nm. In one embodiment, 2-3 nm (or smaller) Pt is surrounded by 2-3 nm (or smaller) $RuO_2$. The structure of the catalytic material is a heterojunction with atomically connected interface between Pt and $RuO_2$.

Certain embodiments may facilitate a lower electrode loading due to the improved performance properties.

Experimental Results

Carbon-supported heterojunction catalysts were prepared by solvothermal synthesis and subsequent thermal treatment. Scale-up synthesis to 1 g/batch yield enables a thorough investigation of its MEA performance in combination with rotating disk electrode ("RDE") studies. The results show a unique morphology with ultrafine Pt particle sizes, and atomically connected interfaces between Pt and $RuO_2$ provide high catalytic activity toward HOR while maintaining significantly improved $H_2$ mass transport in MEAs via minimizing undesirable phenyl group adsorption in the polymer electrolyte. The results also demonstrate MEA performance of low anode loading Pt—RuO$_2$/C with those of the state-of-the-art Pt/C and Pt—Ru/C catalysts.

In summary, Pt—RuO$_2$ heterojunction catalyst with ultrafine Pt cluster and atomically connected interface was developed by converting Ru-rich phase of PtRu$_8$ nano-dendrite into Pt—RuO$_2$. The synthetic condition of PtRu$_8$ nanodendrites were investigated and preliminary scale-up was explored. With successful demonstration of one-pot synthesis, further scale-up should be attainable. The Pt—RuO$_2$ heterojunction catalyst showed excellent catalytic activity towards HOR and significantly lower phenyl group adsorption properties compared with commercial Pt/C catalyst. The AEMFC test suggests that the structure of the Pt—RuO$_2$ heterojunction catalyst provides high access of H$_2$ at ultralow loading anode in combination of the good kinetic activity and less degree of phenyl adsorption, making an ideal low PGM loading catalyst for AEMFCs. This result is the first report that that highly active Pt—Ru bimetallic HOR catalyst can be prepared without alloying Pt and Ru components but providing unique morphology of ultrafine Pt cluster and Pt—RuO$_2$ heterojunctions.

Synthesis of Pt—RuO$_2$ Heterojunction Catalysts.

The Pt—RuO$_2$ heterojunction catalyst was prepared from PtRu nanodendrites. Several pathways to the PtRu nanoparticles with high surface area were explored using different combinations of solvent, surfactant, and reducing agent. Some of the pathways were seen to produce Pt rich PtRu nanoparticles, while others produced Ru rich PtRu nanoparticles, which are the desired form for the heterojunction catalyst.

Dibenzyl Ether.

Figure 10A:
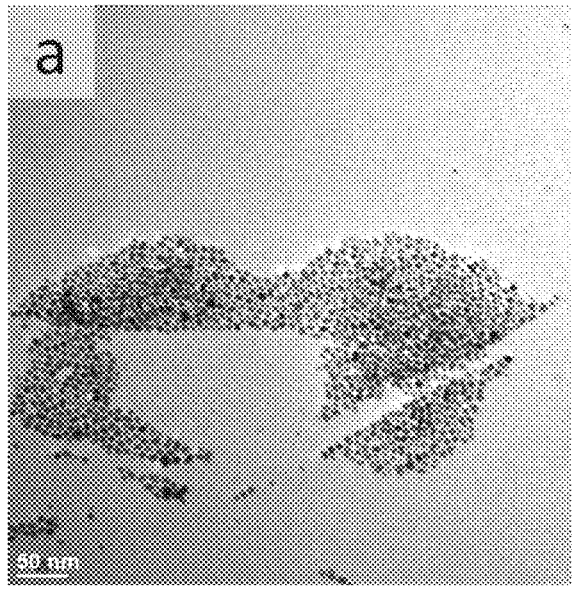
FIGS. 10A-10C show TEM images and EDS spectroscopy of PtRu nanoparticles synthesized in dibenzyl ether with oleylamine/oleic acid (0.5 mL each) as surfactants and 1,2-tetradecanediol (84 mg) as reducing agent.
Figure 10B:
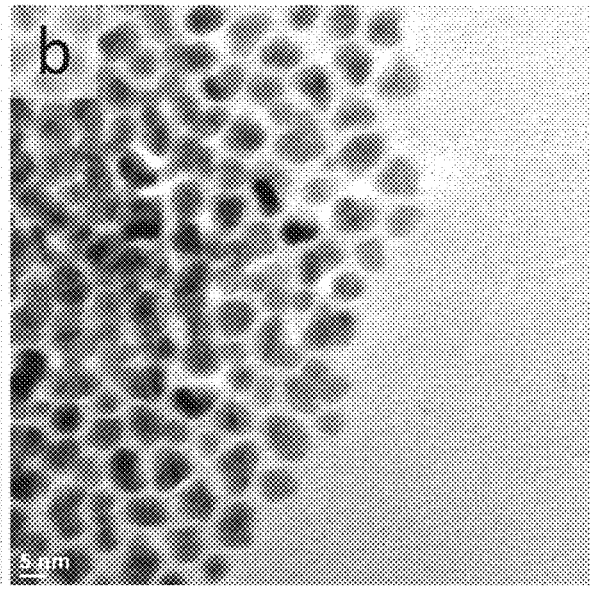
Figure 10C:
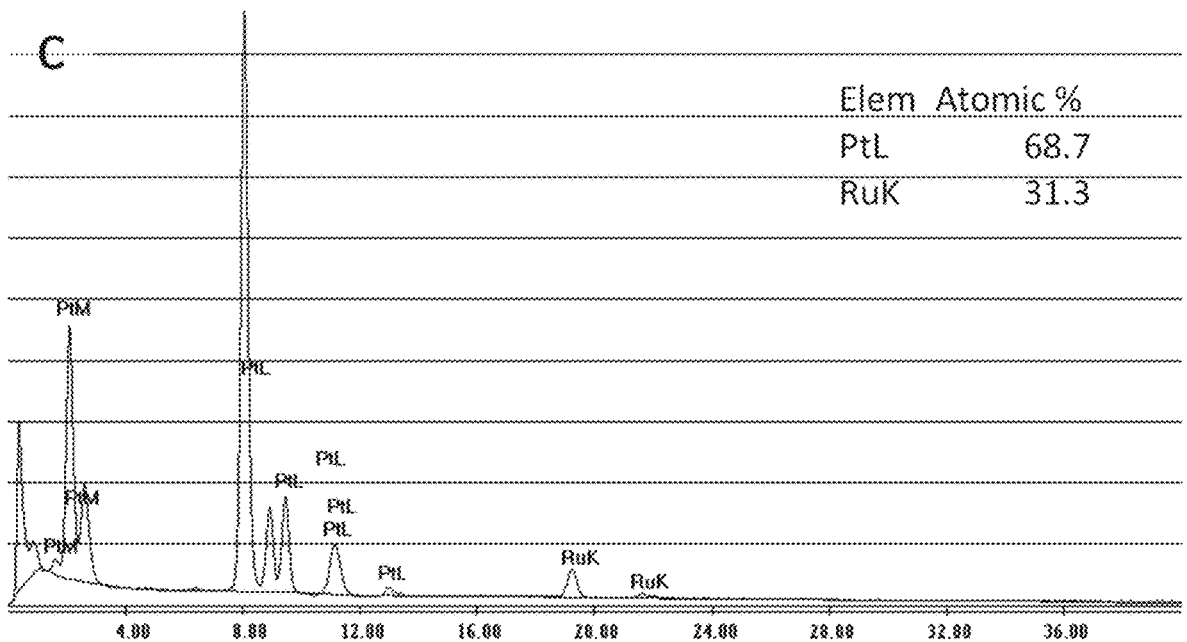

As shown in FIG. 10A, we found Pt$_2$Ru$_1$ nanoparticles of ~5 nm could be made in dibenzyl ether solvent at elevated temperature (FIGS. 10A-C). Specifically, this pathway used dibenzyl ether with oleylamine/oleic acid (0.5 mL each) as surfactants and 1,2-tetradecanediol (84 mg) as reducing agent. The particles synthesized in dibenzyl ether in the presence of oleic acid is Pt-rich and not uniform because the presence of oleic acid hinders the reduction of Ru precursors; thus, we did not pursue this synthetic route.

Further, a sample with 1,2-tetradecanediol as a reducing agent resulted in an elemental percentage of PtL 69.7 atomic %, RuK 31.3 atomic %. Without reducing agent, Ru content in the particle is even lower (PtL 85.4 atomic %, RuK 14.6 atomic %), indicating the mild reducing capability of oleylamine is not sufficient to completely reduce Ru precursor under this reaction condition. Even with this modification, the dibenzyl ether route does not provide sufficient Ru content.

Diphenyl Ether.

Ru-rich nanoparticles with minimal particle size and uniform size distributions could be synthesized in diphenyl ether using 1,2-tetradecanediol and oleylamine. Specifically, experiments for the synthesis of PtRu8 nano-dendrite were performed in an Ar flow environment in a round bottom flask. Typically, 0.12 g Ru(acac)$_3$, 2 mL oleylamine, 0.063 g 1,2-tetradecanediol, and 10 mL diphenyl ether were heated up to 260° C. in a round bottom flask with Ar flow and 0.012 g Pt(acac)$_2$ dispersed in 1 mL dichlorobenzene was injected when the temperature of former solution reach 200° C. The mixture was heated up slowly to 260° C. The reaction time was controlled to 20-30 min starting from injection.

Scale-up synthesis was performed in a bigger round bottom flask with similar synthesis procedure and 6 times higher reaction precursors and reaction volume. Note, severe boiling was observed above 230° C. because the boiling point of dichlorobenzene is only 180° C. Care should be taken on the heating rate to avoid pressure buildup in the flask. Composition of dichlorobenzene could be decreased for larger reaction volume.

Further, a one-pot synthesis was performed in a similar procedure except that all the reaction precursors were heated up in a round bottom flask. By doing so, we eliminated the hot injection step.

For those nanodendrites to be used further in formation of the catalyst, the PtRu$_8$ nanodendrites are separated from the solvents by centrifuge (10000 rpm for 10 min). The collected nanodendrites are then dispersed in chloroform for the annealing step.

Similar particle size and composition were obtained with both 0.5 mL and 2 mL oleylamine as a surfactant and/or slightly changed amount of reducing agent (relative to the prior samples tested) (FIG. 1A) for which the lower surfactant and reducing agent amount is sufficient for the reaction and further increase does not affect the product significantly. Samples yielded a content of: 0.5 mL surfactant and 84 mg reducing agent (PtL 16 atomic %, RuK 84 atomic %); 2 mL surfactant and 84 mg reducing agent (PtL 14.6 atomic % m RuK 85.4 atomic %); and 2 mL surfactant and 65 mg reducing agent (PtL 16.5 atomic %, RuK 83.5 atomic %).

The Ru content in the particle is only slightly lower than the precursor ratio, indicating a very high conversion rate of the Ru precursor. As shown in FIG. 1B, PtRu$_8$ nanodendrites can be loaded onto carbon support uniformly. HRTEM image (FIG. 1C) and selected area electron diffraction ("SAED") pattern (FIG. 1D) demonstrated the crystalline nature of the nanodendrites. Although the SAED pattern is weak with ultra-small particle size, HAADF imaging and corresponding EDS mapping revealed that the PtRu$_8$ nanodendrites are composed of Pt-rich core surrounded with Ru-rich branches (FIGS. 1E-1H). From these results, the formation of PtRu$_8$ nanodendrites starts with Pt-rich nuclei because Pt is easier to be reduced than Ru. As the reaction progresses, Pt(acac)$_2$ is depleted, and Ru-rich branches continue to grow on the surface, leading to the dendrite structure.

Collected PtRu$_8$ nanodendrites were dispersed in chloroform and were then mixed with proper amount of carbon, which can be calculated from the target PtRu loading on carbon, which was also dispersed in chloroform by sonication. The mixture was sonicated for 20 min and the carbon supported PtRu$_8$ nanodendrites were precipitated with hexane and further separated from solvents by centrifuge. This process also works for scale-up sample preparation; larger amounts of solvents were used to ensure good dispersion of PtRu$_8$ nanodendrites on carbon. The carbon supported PtRu$_8$ nanodendrites were annealed in air at 185° C. overnight to convert elemental Ru into RuO$_2$ and to remove the surfactant adsorbed on the surface of catalyst.

Initially synthesis the Pt—RuO$_2$ heterojunction catalysts on a small scale (0.2 g/batch). Later, a scale-up synthesis of the Pt—RuO$_2$ heterojunction catalyst was investigated by addressing heat transfer and mass transport challenges. With six times higher volume reaction, the boiling of the reactants above 230° C. is more severe than small batch synthesis because the amount of dichlorobenzene (boiling point=180° C.) is also six times higher while the removal rate of dichlorobenzene by argon flow is limited. The heating rate also decreases as more time is needed for reactants to reach the same reaction temperature. However, similar particle size and composition was obtained with the scale-up synthesis (content 14.1 PtL atomic % and 85.9 RuK atomic %). More importantly, scale-up synthesis is highly reproducible.

The process of loading PtRu$_8$ nanodendrites on carbon is also scalable. Overall, more than 1 g of Pt—RuO$_2$/C heterojunction catalyst was obtained by combining the two batch of scale-up synthesis and subsequent annealing in air. Notably, injecting precursors into hot reactive solution (hot-injection) is not favorable for scale-up. Similar particle size and composition were obtained with one-pot synthesis, indicating this newly developed recipe is indeed scalable.

The Pt—RuO$_2$ heterojunction catalyst was obtained by annealing of the carbon supported PtRu$_8$ nanodendrites in the air at 185° C. overnight, and Ru was converted into RuO$_2$. As shown in FIGS. 2A-2H, the uniform dendrite structure was converted into a composite structure with lower contrast due to RuO$_2$ formation. The HRTEM image in FIG. 2B and SEAD in FIGS. 2C-2D indicate the formation of Pt—RuO$_2$ heterojunction structures with atomically connected interfaces. The HAADF imaging and EDS mapping results in FIGS. 2E-2H further demonstrate the Pt—RuO$_2$ heterojunction structure. Compared with the PtRu$_8$ nanodendrites, the size of the Pt-rich particle is slightly smaller, indicating some of the Ru in these Pt-rich areas is also oxidized and migrated to the RuO$_2$ region. Also observed was some Pt dispersed in the Ru-rich area, which may be beneficial to the performance at a low-Pt loading AEMFC anode. In some embodiments, during the formation of Ru rich dendrites, there are still Pt precursors left, thus small amount of Pt is observed in Ru rich dendrites.

Figures 5A, 5B:
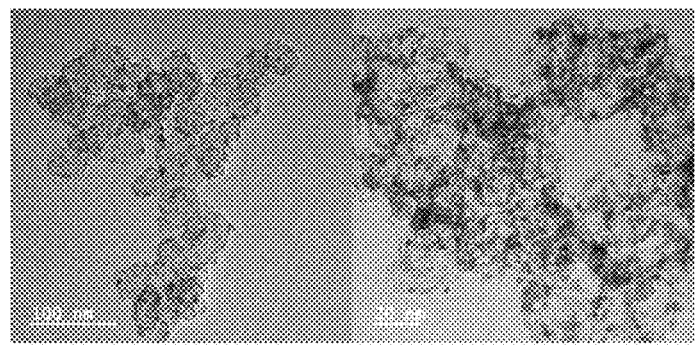
FIGS. 5A-5B show TEM images of scale-up Pt—$RuO_2$ nanoparticles supported on high surface area carbon.
Figure 5C:
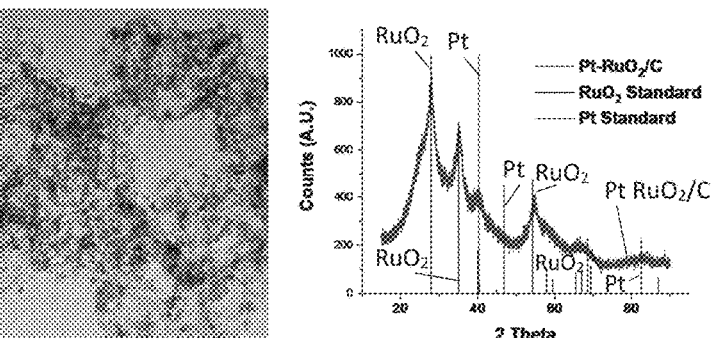
FIG. 5C shows the corresponding X-ray diffraction ("XRD") pattern ($RuO_2$ standard PDF #01-071-48251; Pt standard PDF #01-087-0647).

ICP-MS confirms that the atomic ratio of Pt:Ru in the heterojunction catalysts prepared from the scale-up synthesis is 1:8. TEM images (FIGS. 5A-5B) showed the six times scale-up Pt—RuO$_2$ nanoparticles are monodisperse (most particles fall in the range of 3-6 nm in diameter) and are uniformly distributed on high surface area carbon support. XRD pattern also proves that the RuO$_2$ dominates the particle composition (FIG. 5C). The carbon supported Pt—RuO$_2$ heterojunction catalyst from the scale-up synthesis was further investigated in the RDE and AEMFC testing.

Electrochemical Characterization of Pt—RuO$_2$ Heterojunction Catalysts.

While RDE test in the acidic electrolyte (mostly perchloric acid and sulfuric acid) has been proved as an efficient technique for the catalyst screening of PEMFCs, a systematic study to compare the RDE results in the alkaline electrolyte with the AEMFC performance is yet to be established. Conventionally, NaOH or KOH electrolyte has been used to reveal the kinetic performance of the catalyst in an RDE setup. Our recent work suggested that this might be insufficient for catalyst screening of AEMFCs, as catalyst/ionomer interactions such as phenyl group adsorption and cation-hydroxide-water co-adsorption could mask the intrinsic kinetic performance of a catalyst. In short, under AEMFC operating conditions, the HOR rate imposes limits on its performance, not to discount the need for continuous improvement of ORR catalysis, which is believed to be facile compared with the sluggish ORR in PEMFC.

Figure 3B:
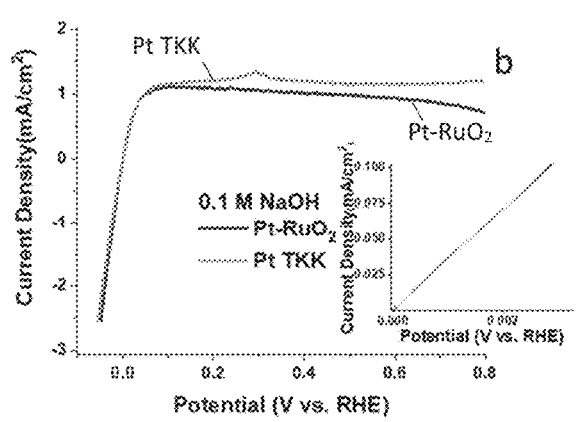
Figure 3C:
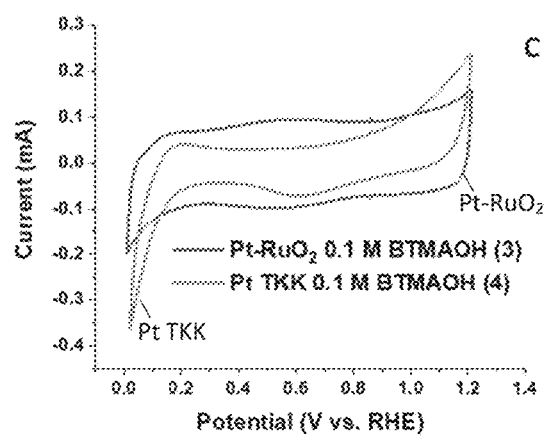
FIGS. 3C-3D show cyclic voltammograms (FIG. 3C) and HOR curves (FIG. 3D) of Pt—RuO$_2$ and Pt TKK in 0.1 M benzyltrimethylammonium hydroxide ("BTMAOH"). Cyclic voltammograms were recorded at 50 mV/s; HOR polarization curves were recorded at 20 mV/s, 900 rpm.
Figure 3D:
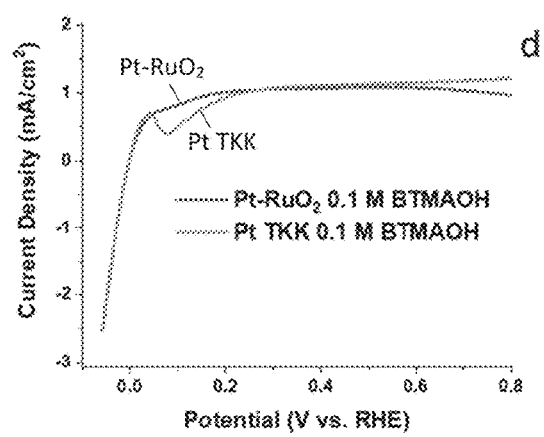

In this work, we carried out the RDE study using two different electrolytes, namely NaOH and BTMAOH, all in 0.1 M solution of Milli-Q water. We first compared the HOR performance by the slope between 0 and 0.1 mA/cm$^2$ instead of the exchange current density, which is difficult to obtain for nanoscale system. Then, we compared HOR current density at 0.05-0.3 V, which is relevant to the AEMFC operating condition. The results are presented in FIGS. 3A-3D. In NaOH, the TKK Pt/C catalyst shows a typical Pt H$_{upd}$ feature between 0.05 V and 0.40 V. Pt—RuO$_2$ catalyst shows big capacitance feature in the same potential region, indicating a RuO$_2$ rich surface (FIG. 3A). For HOR performance, Pt/C TKK and Pt—RuO$_2$/C show almost identical kinetic performance near 0 V (FIG. 3B, inset). Note that with the same metal loading, the synthesized Pt—RuO$_2$/C catalyst has approximately 3.5% wt. of Pt only, as opposed to the commercial catalyst with 19.4% wt. of Pt. The Pt clusters and their unique heterojunctions with RuO$_2$ indeed exhibit excellent kinetic performance. When the electrolyte was switched to BTMAOH, TKK Pt/C shows a significant reducing current below 0.2 V, which is likely caused by phenyl group adsorption and subsequent reduction. For Pt—RuO$_2$, very little current drop is observed, which indicates Pt—RuO$_2$ interaction with the phenyl group is much weaker than that of pure Pt (FIG. 3C). In 0.1 M BTMAOH electrolytes, Pt—RuO$_2$ shows higher current at 0.05-0.3 V, where the catalyst/phenyl group interactions take place (FIG. 3D). Overall, RDE results suggest that our Pt—RuO$_2$/C catalyst from the scale-up synthesis has comparable HOR kinetic performance with the commercial Pt/C but higher tolerance of phenyl group poisoning even at significantly lower Pt loading.

Performance of Pt—RuO$_2$ Heterojunction Catalysts in MEA.

Figure 4A:
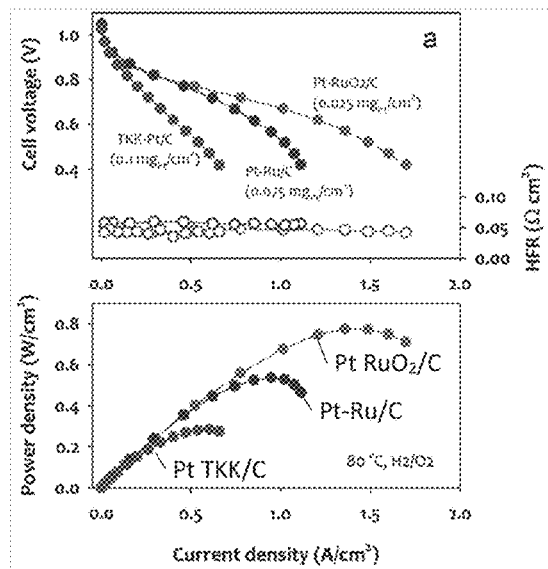
FIG. 4A shows AEMFC performance comparison between MEAs; anode catalyst: Pt—RuO$_2$/C, TKK-Pt/C, and JM HiSPEC® 12100 Pt—Ru/C; cathode catalyst: Pt/C (0.6 mg$_{Pt}$/cm$^2$). AEMFC performance at 80° C. with humidified $H_2$ (2000 sccm) and $O_2$ (1000 sccm) at 285 kPa backpressure.
Figure 6:
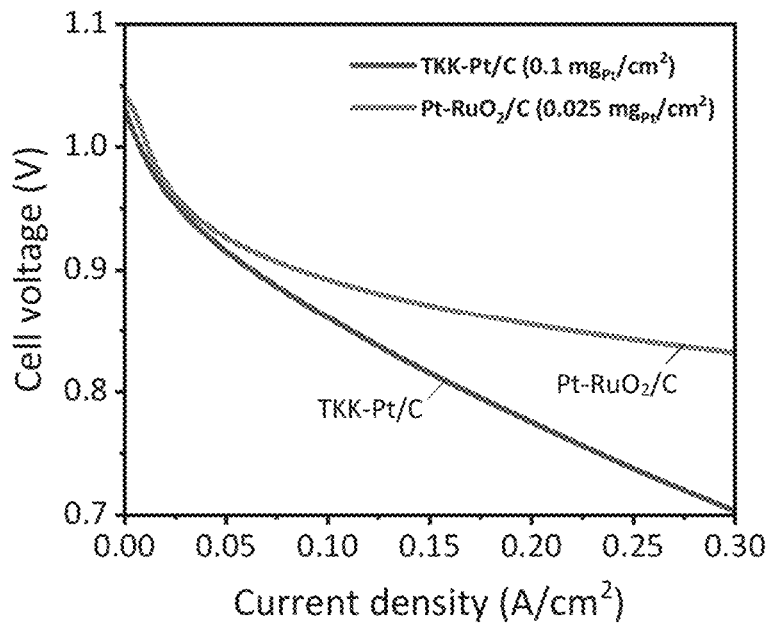
FIG. 6 shows a graph of the kinetic performance of Pt/C and Pt—$RuO_2$/C anode catalyzed MEAs in terms of iR-corrected polarization curves at 80° C. with humidified $H_2$ (2000 sccm) and $O_2$ (1000 sccm) at 285 kPa backpressure. Cathode: Pt/C (0.6 $mg_{Pt}/cm^2$).

We evaluated the performance of Pt—RuO$_2$/C heterojunction and other state-of-the-art Pt-based anode catalysts in MEA. The MEAs tested have the same MEA components except for the anode catalyst. The ionomer to carbon ("I/C") ratio of the anode was optimized for the best AEMFC performance. FIG. 4A compares the polarization curve, cell high frequency resistance ("HFR") and power density of the MEAs employing low Pt loading Pt/C, PtRu/C, and Pt—RuO$_2$/C anode catalysts. Under the H$_2$/O$_2$ conditions, the MEA using Pt—RuO$_2$/C anode catalyst exhibits exceptionally high performance in spite of the lower Pt loading. The peak power density of the MEA using Pt—RuO$_2$/C anode reached 0.77 W/cm$^2$, as opposed to the MEA using Pt/C and PtRu/C anode catalysts of which the peak power density was 0.28 and 0.55 W/cm$^2$, respectively. All MEAs have similar cell HFR (~0.045 W/cm$^2$), confirming that the different performance is not originated from MEA hydration and catalyst-AEM interface. The kinetic performance difference between the Pt/C and Pt—RuO$_2$/C catalyzed MEAs is negligible, for example, the iR-corrected current density of the MEAs at 0.95 V are similar (0.026 A/cm$^2$ for Pt/C vs. 0.028 A/cm$^2$ for Pt—RuO$_2$/C) at the similar metal loading (FIG. 6), while the performance difference became significant as the current density increases. For instance, the current density of the Pt—RuO$_2$/C catalyzed MEA at 0.85 V is 0.22 A/cm$^2$, ~2 times of the Pt/C catalyzed MEA. This result is consistent with the RDE experiment where the kinetic activity of Pt—RuO$_2$/C and Pt/C is comparable, but the overall activity of the Pt/C catalyst is hindered by the adverse adsorption of the phenyl groups of the ionomer. The performance comparison between PtRu/C and Pt—RuO$_2$/C catalyzed MEAs indicates that the kinetic performance of the MEA using PtRu/C catalysts is slightly higher than that of the MEA using Pt—RuO$_2$/C (0.036 A/cm$^2$ for PtRu/C vs. 0.028 A/cm$^2$ for Pt—RuO$_2$/C at 0.95 V). However, the performance at the high current density region, ca. >1.0 A/cm$^2$, the Pt—RuO$_2$/C catalyzed MEA showed significantly higher performance than the PtRu/C catalyzed MEA.

Figure 7:
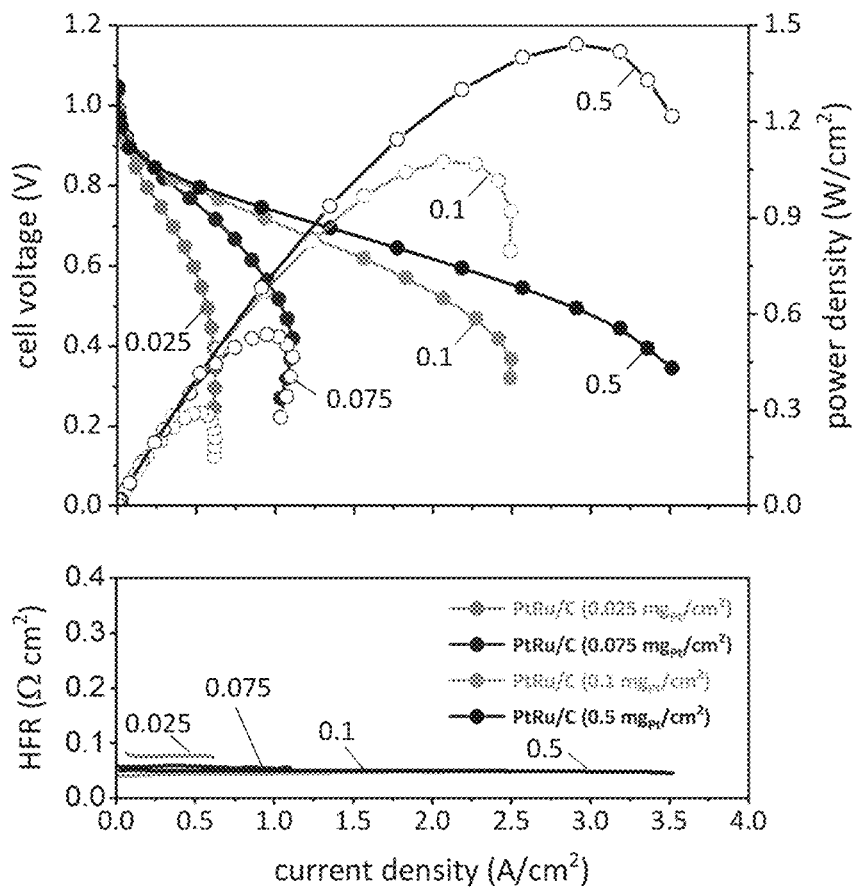
FIG. 7 is a graph of the effect of Pt loading at anode on AEMFC performance. Anode catalyst: JM HiSPEC® 12100 PtRu/C, cathode: JM HiSPEC® 9100 Pt/C (0.6 $mg_{Pt}/cm^2$). Fuel cells performances were obtained at 80° C. with fully humidified 2000 sccm $H_2$ and 1000 sccm $O_2$ at 285 kPa backpressure.

The notably higher performance of Pt—RuO$_2$/C catalyzed MEA could not alone be explained by the phenyl group adsorption since both catalysts have minimal phenyl group adsorption. There are two possible reasons behind the high performance of Pt—RuO$_2$/C. First, the lower ratio of metal to carbon in electrocatalysts (15% for Pt—RuO$_2$/C vs. 75% for PtRu/C) increases the electrode thickness which improves the mass transport at the low loading anode. The electrode thickness effect is also apparent in the fuel cell performance as a function of anode PGM loading (FIG. 7). The peak power density of Pt—$RuO_2$/C MEA increased only about 20% with 4-times higher anode catalyst loading, while the peak power density of PtRu/C MEA increased ~3.5 times with 4-times higher anode catalyst loading. This indicates that our novel Pt—$RuO_2$/C heterojunction catalyst works really well for low PGM loading electrodes, on the other hand, the commercial PtRu/C catalysts with high metal content only perform well at higher PGM loadings. Second, the ultrafine Pt clusters surrounded by large $RuO_2$ particles create desirable morphology for the mass transport. The superior $H_2$ mass transport of the Pt—$RuO_2$/C at the low loading electrode is also evidenced by the AEMFC performance at reduced $H_2$ flow. The Pt—$RuO_2$/C catalyzed MEA shows only slightly inferior performance of 0.72 W/cm² at a much lower flow rate, while more significant performance loss is observed for the PtRu/C catalyzed MEA (FIGS. 8A-8B). The Pt—$RuO_2$/C MEA shows the peak power density of 0.33 W/cm² at 0.48 V, achieving the specific power (13.2 W/$mg_{Pt}$) under $H_2$/$CO_2$-free air conditions (FIG. 9).

Figure 4B:
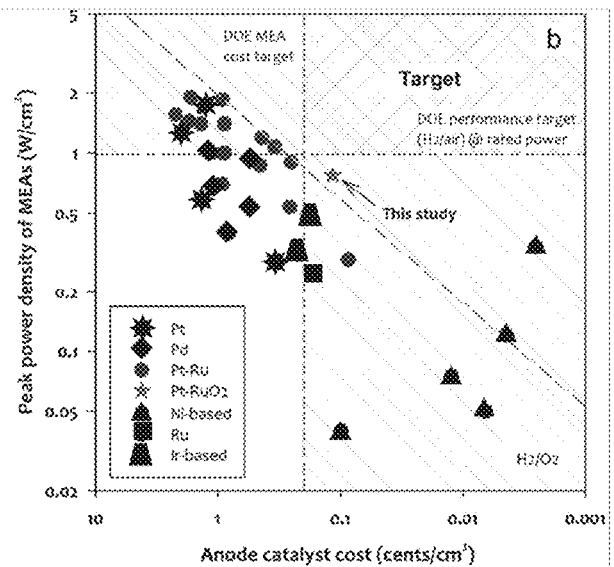
FIG. 4B shows AEMFC peak power density comparison as a function of anode catalyst cost; AEMFC performance was taken from literatures. Anode catalyst cost was calculated from a 5-year average of base metal price.

We further compare the reported AEMFC performance as a function of the cost of anode catalyst. For this analysis, we collected the peak power density of AEMFCs using state-of-the-art anode catalysts in literature and compared the AEMFC performance normalized for anode catalyst cost per cm² area based on the 5 year average price of metals. FIG. 4B plots the peak power density of the MEAs as a function of anode catalyst cost with two target lines (i.e., 2020 US DOE MEA cost target (0.2 cents/cm²) and the rated performance at rated power (1 W/cm²) under $H_2$/air conditions. FIG. 4B shows that Pt—Ru alloy catalysts have better performance than Pt-, Pd-, Ru-, and Ir-based catalysts at a given catalyst cost. Among the Pt—Ru alloy catalysts shown, four catalysts are located on the upper-performance-cost limit (red dashed line). Those catalysts are the commercial PtRu HiSPEC® 10000 (Pt nominally 40 wt. %, Ru nominally 20 wt. %) supported on Vulcan XC-72R carbon. Two Ni-based non-PGM catalysts are located on or even beyond the upper-performance-cost limit. However, their cell performance needs to improve to reach the DOE performance target. The Pt—$RuO_2$ heterojunction catalyst we prepared from this work is also located beyond the upper-performance-cost limit, suggesting that the formation of ultrafine Pt cluster with Pt—Ru heterojunction is a promising approach to meet fuel cell cost and performance targets for transportation application. Further optimization of catalyst composition and morphology of the heterojunction catalysts with developing non-PGM ORR catalysts may need for advanced AEMFC systems.

Physical Characterization.

The TEM images were obtained on an FEI Tecnai F20 and JEM-2100F microscopes with accelerating voltage at 300 and 200 kV, respectively. Selected area electron diffraction patterns and EDS results were recorded with JEM-2100F microscope equipped with an Oxford EDS detector. HAADF images and energy dispersive X spectroscopy mapping were recorded on a FEI Talos F200X scanning transmission electron microscope ("STEM") with an accelerating voltage of 200 kV at the Center for Nanoscale Materials, Argonne National Laboratory. XRD patterns were recorded from a Siemens diffractometer D5000. The ICP results of PtRu sample are 7.4 (Ru):1 (Pt), 7.6:1, and 7.7:1 for 3 runs. It is averaged to 7.6:1 and the sample in the manuscript was denoted to $PtRu_8$.

RDE Study.

Synthesized Pt—$RuO_2$/C (17% metal wt. on high surface area carbon, Pt/Ru atomic ratio 1/6) and commercial Pt/C (TKK TEC10E20A, 19.4% Pt wt.) were dispersed in water under untrasonication. The catalyst concentration of both inks was 1.25 mg/mL. The ink was pipetted onto a glassy carbon disk (5 mm in diameter) to make 20 μg/cm² metal loading and dried in air at room temperature. 10 μL of Nafion D521 (diluted to 0.1% wt.) was then added on the surface as a binder to keep the catalyst on the glassy carbon.

A home-made fluorinated ethylene propylene ("FEP") cell was used for electrochemical characterization of the catalyst. 0.1 M aqueous solution of NaOH (99.99% from Sigma Aldrich) and BTMAOH (40% wt. solution in water from TCI Chemical) were used as electrolyte. A mercury/mercury oxide (Hg/HgO) electrode (Pine) was the reference electrode and a graphite rod (Sigma Aldrich) was the counter electrode. The reference potential was converted to RHE. Cyclic voltammograms were recorded in nitrogen purged electrolyte. Before hydrogen oxidation reaction curves were recorded at 900 rpm, the electrolyte was saturated with hydrogen and the working electrode was subject to 1.40 V for 30 seconds to remove the cation adsorption.

Membrane Electrode Assembly.

The catalyst inks for anode were formulated using Pt/C (TKK TEC10E20A, 19.4 wt. % Pt), synthesized Pt—$RuO_2$/C (15% metal loading on TKK carbon support) with alkyl ammonium tethered poly(fluorene) ("FLN") ionomer (5 wt. % in 1:1 solution of isopropanol-ethanol) in 20:80 v/v % water—isopropanol solution. The two sets of anodes were prepared with different Pt loading where I/C ratios were 40% for Pt/C and synthesized Pt—$RuO_2$/C, respectively. The Pt/C (HiSPEC® 9100, Johnson Matthey Fuel Cells, USA) and FLN ionomer were used for the cathode in all MEAs. For cathodes, Pt loading and I/C ratio were 0.6 mgPt/cm² and 42%, respectively. The catalyst ink was brush painted on the BC-29 (gas diffusion layer, 5 cm², 270 μm thickness) on the vacuum table at 60° C.

The quaternized poly(terphenylene) ("TPN") membrane was used as polymer electrolyte. Prepared anode, cathode and membrane were used to fabricate MEA after converting to hydroxide form by immersing in 1 M NaOH solution. The MEA was then placed into the fuel cell hardware (5 cm², serpentine flow field) supplied by Fuel Cell Technologies Inc.

Single-Cell Tests.

The pure hydrogen at 2000 sccm and oxygen or $CO_2$-free air at 1000 sccm supplied to anode and cathode respectively at 100% relative humidity. All the fuel cell tests were performed at operating temperature of 80° C. The polarization curves were acquired at absolute backpressures of 285 kPa using a fuel cell station (Fuel Cell Technologies Inc., USA). Built-in impedance analyzer was used to measure the HFR while obtaining the polarization curves.

Definitions

No claim element herein is to be construed under the provisions of 35 U.S.C. § 112(f), unless the element is expressly recited using the phrase "means for."

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. A method of forming a PtRuO$_2$ heterojunction catalyst forming a solution of platinum precursor, a ruthenium precursor, diphenyl ether, 1,2-tetradecanediol, oleylamine, and dichlorobenzene;

heating the solution to a reaction temperature between 230-270° C. for 5 min-1 h, forming platinum-ruthenium nanodendrites;

separating the platinum-ruthenium nanodendrites from the solution;

suspending the platinum-ruthenium nanodendrites in organic solvent forming a suspension;

mixing carbon nanoparticles with the suspension;

isolating platinum-ruthenium nanodendrites loaded with the carbon nanoparticles from the suspension; and annealing the isolated platinum-ruthenium nanodendrites loaded with the carbon nanoparticles, forming platinum-ruthenium oxide nanodendrites.

2. The method of claim 1, wherein the solution comprises a ratio of platinum precursor to ruthenium precursor of 1:12 to 1:6.

3. The method of claim 2, wherein the Pt precursor is platinum (II) acetylacetonate [Pt(acac)$_2$].

4. The method of claim 2, wherein the Ru precursor is ruthenium(III) acetylacetonate [Ru(acac)$_3$].

5. The method of claim 1, wherein the platinum-ruthenium nanodendrites are PtRu$_8$ nanodendrites.

6. The method of claim 5, wherein the platinum-ruthenium nanodendrites loaded with the carbon nanoparticles is carbon-PtRu$_8$ material.

7. The method of claim 1, wherein the solution is formed by mixing the platinum precursor, the ruthenium precursor, the diphenyl ether, the 1,2-tetradecanediol, and the oleylamine and heating to at least 200° C., wherein the dichlorobenzene is then added.

8. The method of claim 1, wherein suspending the platinum-ruthenium nanodendrites comprises dispersing the platinum-ruthenium nanodendrites in chloroform.

9. The method of claim 1, wherein annealing is at an anneal temperature of 100-200° C.

10. The method of claim 1, wherein the platinum-ruthenium oxide nanodendrites comprise ultrafine particles.

11. A method of forming nanodendrites comprising:

forming a solution of platinum precursor, a ruthenium precursor, diphenyl ether, 1,2-tetradecanediol, oleylamine, and dichlorobenzene;

heating the solution to a reaction temperature between 230-270° C. for 5 min-1 h, forming PtRu$_8$ nanodendrites; and separating the PtRu$_8$ nanodendrites from the solution.

12. The method of claim 11, wherein the platinum precursor is Pt(acac)2 and the ruthenium precursor is Ru(acac)$_3$.

13. The method of claim 11, wherein the solution comprises a ratio of platinum precursor to ruthenium precursor of 1:12 to 1:6.

14. The method of claim 13, wherein the Pt precursor is platinum (II) acetylacetonate [Pt(acac)$_2$].

15. The method of claim 13, wherein the Ru precursor is ruthenium(III) acetylacetonate [Ru(acac)$_3$].

* * * * *